L. A. & R. H. BIGGAR.
LUBRICATOR.
APPLICATION FILED JUNE 27, 1917.
1,274,975.
Patented Aug. 6, 1918.
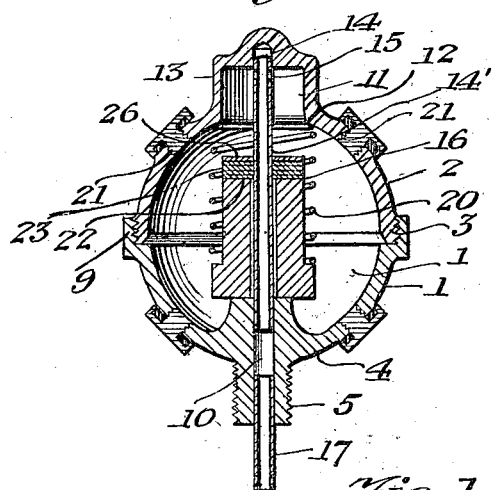
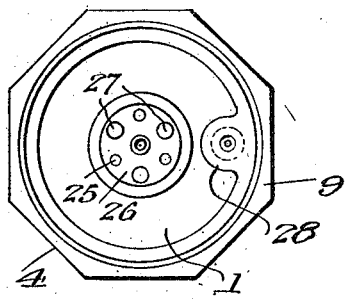
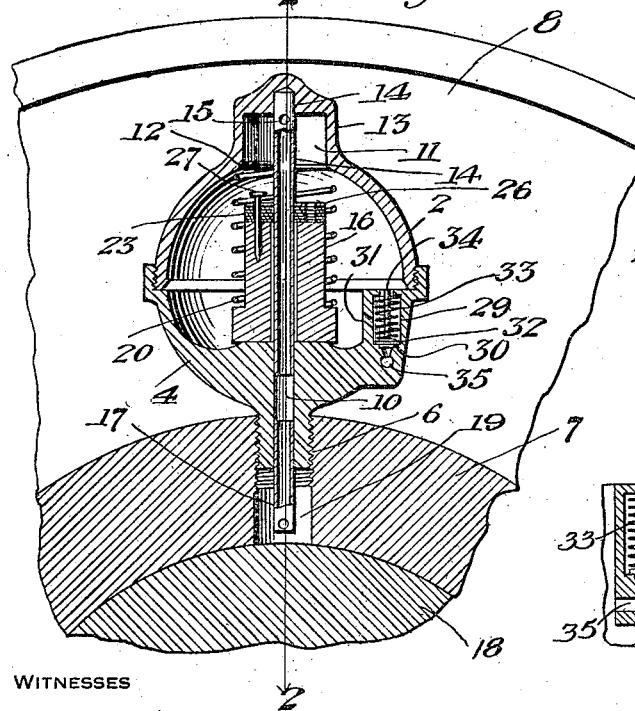
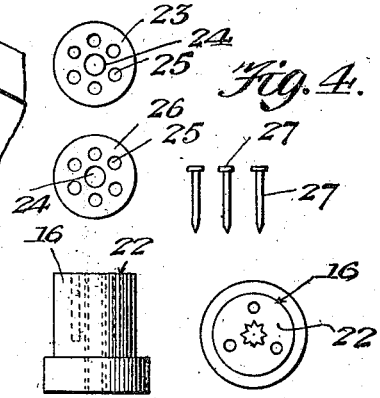
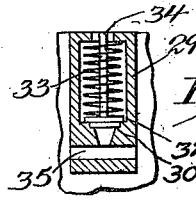
WITNESSES
I. A. Hayton.
D. B. Phillips
INVENTORS
L. A. Biggar
R. H. Biggar
BY Victor J. Evans
ATTORNEY

UNITED STATES PATENT OFFICE.

LEROY A. BIGGAR AND RUTHERFORD H. BIGGAR, OF ONEIDA, NEW YORK.

LUBRICATOR.

1,274,975.  Specification of Letters Patent.  Patented Aug. 6, 1918.

Application filed June 27, 1917. Serial No. 177,336.

*To all whom it may concern:*

Be it known that we, LEROY A. BIGGAR and RUTHERFORD H. BIGGAR, citizens of the United States, residing at Oneida, in the county of Madison and State of New York, have invented new and useful Improvements in Lubricators, of which the following is a specification.

This invention relates to improvements in automatic lubricators, and has particular reference to an oil cup for loose pulleys and the like.

In carrying out this invention it is proposed to provide more efficient means for maintaining an oil-tight fit between the piston and the cylinder of the cup.

It is further intended to provide a more satisfactory automatically opened and closed air-vent for the device, and to simplify the construction and reduce the cost of manufacture.

With these objects and others which will hereinafter become evident in view the invention is embodied in the constructional features and arrangement thereof described below, illustrated in the drawings, and set forth in the claims.

In the drawings:—

Figure 1 represents a longitudinal section through the cup as attached to the hub of a pulley.

Fig. 2 is a transverse section taken on the line 2—2 of Fig. 1.

Fig. 3 is an end view of the piston.

Fig. 4 shows the packing disks and associated parts as removed from the piston.

Fig. 5 is a detail sectional view of the air inlet valve.

Referring to the drawings more specifically, the cup has a body 1 formed with a cavity 1' constituting an oil reservoir. The body 1 comprises an outer section 2 having an externally threaded lip 3 and an inner section 4 having a shank 5 adapted for screw threaded engagement in the usual opening 6 extending inwardly through the hub 7 of a pulley 8 shown as journaled on a shaft 18. The inner section 4 is provided with an internally threaded annular lip 9 for engaging over the lip 3 of the outer section to form a secure oil tight joint. Externally, the lip 9 is preferably polygonal in form for convenient application of a tool to tighten and loosen the cup in the pulley. The shank 5 is perforated longitudinally with a bore 10, and the section 2 is formed with a hollow cylinder 11 coaxially disposed to the bore 10 and opening into the cavity 1 with an enlarged mouth having a rounded or beveled edge 12. The head 13 of the cylinder is formed centrally with a recess 14, and a hollow shaft 14' has one end inserted in the bore 10 to form an oil tight joint and the other end loosely seated in the recess. The wall of the shaft 14' is formed adjacent the cylinder head 13 with an opening 15. Slidably mounted on the shaft 14' is a weight having the outer end formed to constitute a piston 16 adapted to be actuated centrifugally in an initial rotation of the pulley 8 to enter the cylinder 11 and force oil trapped therein through the opening 15 the hollow shaft 14' and the bore 10 into the opening 6 in the pulley hub 7 to lubricate the bearing. A tube 17 may be inserted in the bore 10 to carry the oil to the shaft 18 and to form an oil-retaining pocket 19. The usual spring 20 for returning the piston 16 and plugged openings 21 for filling the reservoir are provided.

The novelty of the invention lies partly in the unique method of preventing leakage of oil past the piston 16. To effect this the piston head 22 is finished true and flat, and positioned thereon is a plurality of superimposed disks 23 adapted for sliding movement in but closely fitting the cylinder 11. Each disk 23 is formed centrally with an opening 24 for loosely engaging over the shaft 14, and outwardly therefrom with a plurality of openings 25 preferably disposed in an annular row. To retain the disks 23 on the piston 16 a retaining disk 26, preferably of metal, is similarly formed with an opening 24, and with openings 25 preferably less in number than those in the disks 23. Through the openings 25 of the disk 26 and coinciding openings 25 of the disks 23 extend headed pins 27 terminally secured in the piston head 22, and arranged to permit slight longitudinal movement of the disks.

The pins 27 are a loose fit to the openings 25, whereby a slight lateral movement of the disks is permitted to compensate for irregularities in the cylinder 11, or in the disposition of the shaft 14', or for wear on the disk 23. The openings 25 unoccupied by pins are adapted to promote the return movement of the piston by relieving a partial vacuum which would otherwise be formed in the cylinder 11. We have found that sheet mica has many advantages over other materials for constructing the disks 23, but various other materials may be used with success when desired.

For relieving a partial vacuum formed in the body 1 in the ejection of oil, the wall of the section 4 is provided with a thickened portion 28 formed with an inwardly extending bore 29 terminating in a valve-seat 30 provided with an opening 31 extending through the wall of the section 4 to establish communication between the cavity 1' and the outside air. The opening 31 is normally closed by a puppet valve 32 slidably inserted in the bore 29 and adapted to be lifted from the seat 30 by suction or by centrifugal force or both in conjunction. A compression spring 33 having one end bearing against the valve 32 is provided for seating the valve when the pulley is stationary; and is here shown as bearing at the other end against a shoulder formed by swaging the mouth of the bore 29 inwardly to form a reduced portion adapted to slidably receive and constitute a guide for the stem 34 of the valve 32. Under some circumstances we may form the wall of the bore with a passage 35 to facilitate entrance of air to the cavity 1' in the open position of the valve 32.

The herein-described embodiment of our invention, while constituting a preferred form, is not to be interpreted as in any way limiting the spirit or scope of the invention, it being apparent that many and varied forms may be constructed without departing from the spirit of the invention as defined by the scope of the claims.

What we claim is:—

1. A lubricator comprising a reservoir having a cylinder therein, a piston adapted to enter said cylinder to expel fluid from the cylinder, a plurality of perforated mica disks on said piston, and means for loosely holding said disks in place and permitting the same to move longitudinally.

2. A lubricator comprising a reservoir having a cylinder formed therein, a piston adapted to engage with said cylinder and having its end smooth and provided with holes, mica disks seated on said end and having perforations therein and nails loosely engaging with some of said perforations and entering the holes in the piston head.

3. In a fluid actuating device, a cylinder, a piston adapted to enter said cylinder, and a plurality of superimposed disks mounted on one end of said piston, and means for mounting the said disks so the same will have movement longitudinally and laterally of the piston.

4. In a fluid actuating device, a cylinder, a piston adapted to enter said cylinder, and a plurality of superimposed disks loosely mounted on one end of said piston and having longitudinal movement thereof, said disks formed with a plurality of coinciding holes.

5. In an oil cup, a reservoir formed with a vent and an outlet, a cylinder in said reservoir, a piston in said reservoir adapted to enter the cylinder to expel oil from the outlet, a plurality of perforated disks loosely mounted in face to face relation on the inner end of the piston, and a valve normally closing said vent and adapted to be opened simultaneously with the operation of said piston.

6. A piston for liquid actuating devices having a head, a plurality of superimposed disks positioned on said head, each disk having a plurality of openings, pins on said head extending through some of said openings and heads on said pins located above the outermost disk so as to permit movement of said disks.

In testimony whereof we affix our signatures.

LEROY A. BIGGAR.
RUTHERFORD H. BIGGAR.

Copies of this patent may be obtained for five cents each, by addressing the "Commissioner of Patents, Washington, D. C."